Oct. 28, 1947. W. VAN B. ROBERTS 2,429,771
FREQUENCY RESPONSIVE REMOTE CONTROL SYSTEM
Filed Sept. 26, 1942 2 Sheets-Sheet 2
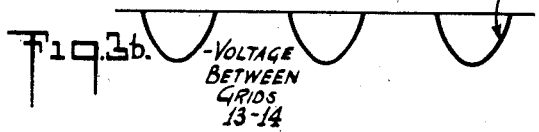
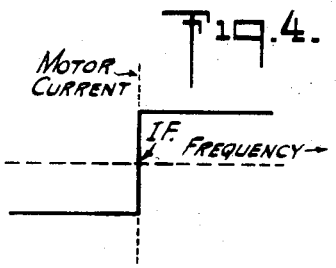
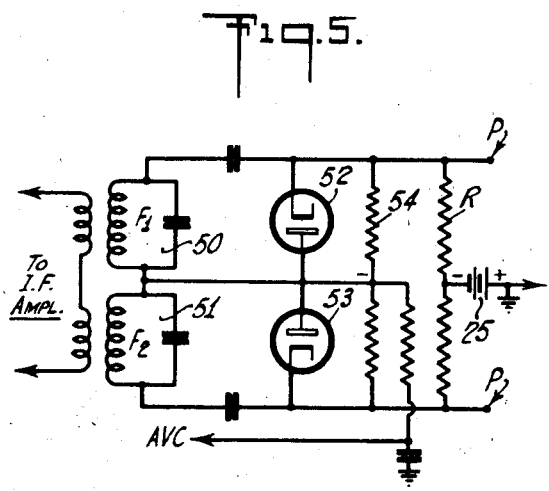
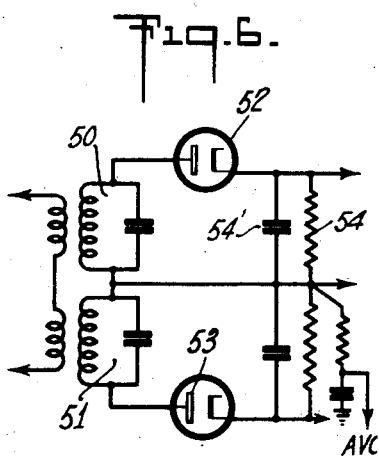
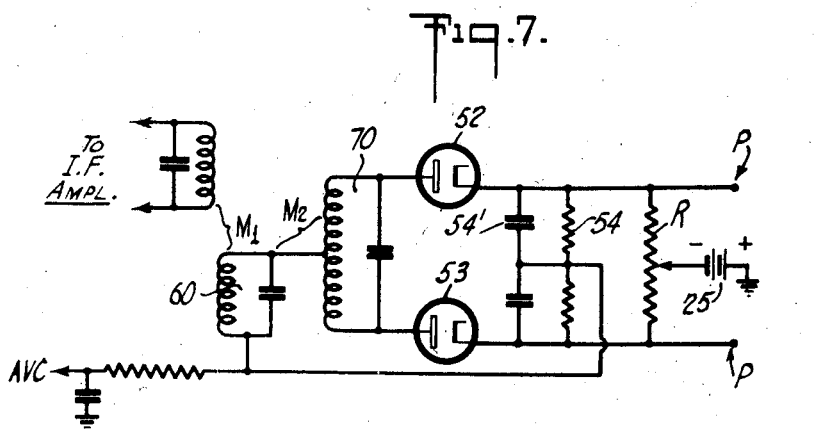
INVENTOR
WALTER VAN B. ROBERTS.
BY
ATTORNEY Patented Oct. 28, 1947

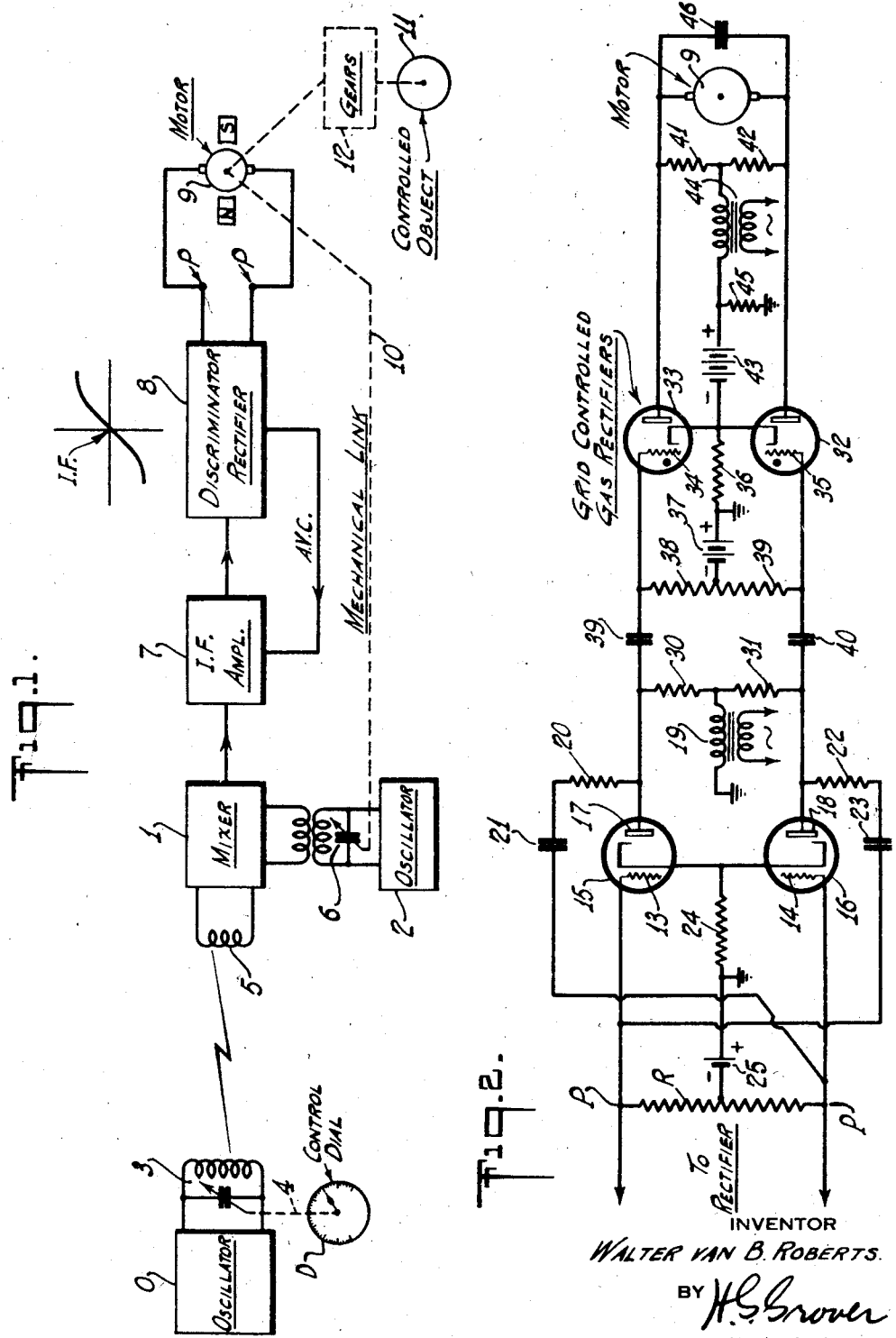

2,429,771

UNITED STATES PATENT OFFICE 2,429,771

FREQUENCY RESPONSIVE REMOTE-CONTROL SYSTEM

Walter van B. Roberts, Princeton, N. J., assignor to Radio Corporation of America, a corporation of Delaware Application September 26, 1942, Serial No. 459,783

4 Claims. (Cl. 318—28)

My present invention relates to remote control systems, and more particularly to systems of the type employing a variable-frequency oscillator at a controlling point.

One of the main objects of this invention is to provide an improvement on known methods for remote control, wherein a variable-frequency oscillator is located at a controlling point while a discriminator means is used at the controlled position for adjusting a movable object to a position corresponding to the setting of a remote control element.

Another important object of the invention is to provide means for remotely controlling a movable device in such a manner that its position will automatically take on a value corresponding to the setting of an element at the controlling point.

Still another object of my invention is to provide means for adjusting a remotely located motor device to a displacement corresponding to the displacement of a control member, including means for developing a constant current through said motor in a direction corresponding to the displacement of said motor from said desired position and so chosen as to make the motor torque tend to drive the motor toward said position.

Another object of this invention is to provide an arrangement for driving a push-pull audio amplifier directly from the output of a frequency discriminator, there being complete balance in the entire system.

Still another feature of the present invention is the provision of a frequency discriminator which is capable of providing automatic volume control (AVC) voltage without upsetting the balance of the discriminator network.

Still other objects of the invention are to improve generally systems of the aforementioned type, and more especially to provide such systems in a highly efficient and economical manner.

Other features of the invention will best be understood by reference to the following description, taken in connection with the drawing, in which I have indicated diagrammatically several circuit organizations whereby my invention may be carried into effect.

In the drawing:

Fig. 1 shows schematically a system embodying the invention,

Fig. 2 illustrates the motor control circuit which is preferred,

Figs. 3a, 3b and 4 graphically show the operation of the invention,

Figs. 5, 6 and 7 respectively show different embodiments of a discriminator-rectifier capable of being employed in the system of Fig. 1.

Referring, now, to the accompanying drawing, wherein like reference characters designate similar elements, Fig. 1 shows a dial D at the remote control point which adjusts the frequency of an oscillator 0. The oscillations so developed are transmitted by radiation, or by wire, to a remote point. At this remote point the radiated oscillations are received by a frequency modulation receiver including a mixer, or converter, tube 1 and a local oscillator 2 for producing an intermediate frequency (I. F.). The intermediate frequency energy is impressed upon a discriminator-rectifier of any well known type. For example, that shown in Fig. 7 may be used. When this intermediate frequency is different from the frequency for which the discriminator is tuned, there will be a difference of potential between terminals P—P which are connected to the output of the discriminator-rectifier. In principle, this difference of potential may be applied to a direct current motor having a permanent magnet field so that the motor will rotate in a direction dependent upon the sign of the discriminator output, and, hence, depending upon whether the intermediate frequency is above or below the discriminator normal frequency.

The motor is mechanically connected to the object to be moved, and, also, to a frequency control element of the local oscillator 2. The connections are such that if the intermediate frequency is too high, the rotation of the motor will change the local oscillator frequency in the direction required to reduce the intermediate frequency. Thus, the motor will operate until the intermediate frequency is brought into coincidence with the frequency at which the discriminator output falls to zero. A similar result takes place if the intermediate frequency is too low. Thus, wherever the control dial D is set, the motor will run until the object to be controlled has been moved into a position corresponding with the dial setting. By a suitable choice of the shapes of the condenser plates of the two oscillators 0 and 2, the controlled object will not only take up a position having a 1 to 1 correspondence with the position of the dial D, but, also, will have an equal displacement with respect to any arbitrary position.

While Fig. 1 illustrates the principle of operation, the schematic arrangement is not adapted in practice for the control of motors of any considerable power, and, therefore, further means constituting the present invention are provided as shown in Fig. 2 to permit control of higher-powered motors. Before describing the circuits of Fig. 2 in detail, the following observations are made relative to the generalized system of Fig. 1.

The oscillators 0 and 2 can be of any well known form. Indeed, any negative resistance device capable of producing oscillations can be used. The numeral 3 designates the adjustable tuning condenser for the tank circuit of the oscillator. The frequency range of the oscillator 0 may be in the kilocycle (kc.) range, or in the megacycle (mc.) band. The adjustable control element D is mechanically coupled, as at 4, to the condenser 3. The mixer 1 will have its input coil 5 resonated to receive the oscillations radiated from the oscillator 0. By broadly tuning the coil 5 any of the frequency variations of the radiated, control oscillations will be transmitted to the mixer. Numeral 6 designates the variable tuning condenser of the tank circuit of oscillator 2. The oscillator will be adjustable over a range of frequencies such as to provide the operating I. F. value.

The I. F. amplifier 7 feeds the amplified I. F. energy to the discriminator-rectifier 8. Above the latter is the typical S-shaped characteristic relating frequencies as absissae to direct current outputs as ordinates. The normal frequency is the I. F. value. AVC bias may be provided for control of the gain of amplifier 7. The rectified output current of network 8 energizes motor 9 to adjust tuning device 6 by the mechanical link 10. The latter may be any well known mechanical gearing. It will be recognized that the network 8—P—P—9—10 is similar in function to the well known form of automatic frequency control (AFC). The current developed at P—P varies in magnitude and sense in response to the frequency deviation, and direction of deviation, respectively of the I. F. energy from the predetermined I. F. value. The controlled object 11 is mechanically coupled, as by gearing 12, to the motor 9. These elements 11 and 12 may be varied in design in accordance with the wishes of the user of the system. For example, object 11 can be a gun, searchlight or the like, while control element D is a remote adjusting device. Such "servo" systems are well known.

In Fig. 2 there is shown the output resistor R of the network 8. The points P—P are connected to respective input grids 13 and 14 of tubes 15 and 16 respectively. The plate of each tube is connected to the grid of the other tube. Such cross-feedback is used to make the outputs independent of signal strength. A pair of tubes so connected are symmetrical, but if there is any potential difference between their grids 13 and 14 the current in one of the tubes will rapidly increase, while that in the other tube decreases. Hence, a large potential difference will be developed between their plates 17 and 18. It will be noted that the plates 17 and 18 are energized by alternating current from the source 19. At each negative half-cycle of applied alternating voltage the pair of tubes 15 and 16 will cease to conduct. At each positive half-cycle a potential difference will be built up between the plates of a polarity dependent upon the sign of the potential difference applied between their grids 13 and 14 by the discriminator.

Fig. 3a shows the potential difference between the amplifier plates 17 and 18 developed when one sign of input voltage is applied between the respective input grids, and Fig. 3b corresponds to the opposite sign. It will be seen that the amplitude of these waves is entirely independent of the magnitude of the voltage input, since the voltage input merely determines the start of the building-up process which is itself carried to completion regardless of the input magnitude.

The feedback path between plate 17 and grid 14 consists of series resistance 20 and condenser 21. The feedback path between plate 18 and grid 13 consists of series resistor 22 and condenser 23. The common cathode connection of tubes 15 and 16 is made to ground through resistor 24. The midpoint of resistor R is connected to ground through a negative biasing battery 25. The laternating current source 19 may consist of a power line (not shown) feeding the primary of a power transformer. The secondary of the latter is connected from the junction of output resistors 30 and 31 to ground.

The output resistors 30 and 31 are coupled to the signal control grids 34 and 35 of tubes 33 and 32 respectively. The latter are schematically represented. Those skilled in the art are well acquainted with the construction thereof. In general, they are grid-controlled rectifiers of the gas type. The dot in each tube represents a filling of gas. The common cathode connection is made to ground through a resistor 36. The negative bias battery 37 has its positive terminal grounded, while the negative terminal is connected to the junction of grid return resistors 38 and 39. Coupling condenser 39 connects the plate 17 to grid 34, and condenser 40 couples plate 18 to grid 35. The plates of tubes 33 and 32 are connected to opposite ends of output resistors 41 and 42.

The negative terminal of source 43 is connected to the common cathode connection of tubes 32 and 33. The positive terminal connects to the junction of 41 and 42 through the secondary winding of power transformer 44. The primary winding of the latter connects to the alternating current power line. The resistor 45 connects the positive terminal of source 43 to ground. Motor 9 has its energizing terminals connected to respective ends of the output resistors 41—42.

The voltage waves shown in Figs. 3a and 3b are applied between the grids 34 and 35 so that one or the other of rectifiers 33 and 32 will be fired, according to the sign of the input between the amplifier grids 13 and 14. To extinguish the rectifier which has been fired, an alternating voltage is applied to the respective plates of sufficient magnitude to make the plate potential negative once per cycle. The motor 9 is connected between the outputs of tubes 32 and 33 so that the motor current will flow in a direction determined by which one of the rectifiers fires. A smoothing condenser 46 may be connected across the motor, if desired. With such a condenser to smooth out the current, the motor current will be as shown in Fig. 4. The latter shows motor current plotted against frequency. It will be seen that the same motor current flows at all times, but that its direction abruptly reverses as the I. F. energy passes through the resonant frequency (operating I. F. value) of the discriminator. The pair of tubes 15 and 16 responds to infinitely small inputs; the second pair of tubes 33 and 32 requires large inputs.

The overall action of the system may be summed up as follows:

When the dial D is moved the motor 9 will run continuously in one direction, until the intermediate frequency energy reaches the resonant frequency of the discriminator. Due to its momentum the motor will not stop at this point, but will continue a little too far. Thereupon the direction of current through the motor reverses, and it will back up and again overshoot the correct position. This back and forth "hunting" process continues indefinitely but with decreasing amplitude, so that the controlled device will be brought infinitely close to its equilibrium position. To prove that the amount of "hunting" will die away to a negligible value it is only necessary to note that the equation of motion of a motor having inertia and friction, and subject to a restoring force which is independent of the displacement, is exactly the same equation as that of a bouncing ball subject to air friction but with perfect elasticity. Obviously any kind of friction in the case of the bouncing ball will cause the successive bounces to become less and less.

In order to still more rapidly damp out the amplitude of "hunting," a brake may be provided for the motor which is applied by means of a spring, but which is removed by centrifugal force. Hence, when a large change is made in dial D and the motor runs continuously in one direction, the centrifugal force will remove the brake and permit the motor to run rapidly. However, when the motor is "hunting" with small amplitude about its equilibrium position, the brake will be effective to rapidly reduce the amplitude of "hunting." It will be seen that very slight changes in the position of the dial D will result in corresponding slight changes in the mean position of the motor. This is an advantage over systems where the motor stops operating at its equilibrium position, and requires a threshold value of change in the position of dial D to start it operating.

In Figs. 5, 6 and 7 I have shown various embodiments of discriminator-rectifier networks which may be used for network 8 of the system of Fig. 1. In Fig. 5, for example, the tuned circuits 50 and 51 are tuned to frequencies $F_1$ and $F_2$ respectively. They are fed by the output circuit of I. F. amplifier 7. They are arranged in series with each other, and with oppositely connected diodes 52 and 53. The common anode connection of 52—53 is made to the junction of circuits 50 and 51. Resistor 54 is connected between the cathodes of diodes 52 and 53, and the midpoint of resistor 54 is connected to the common anode connection of the diodes. The resistor R (see Fig. 2) shunts resistor 54, and bias source 25 connects to the midpoint of resistor R. Terminals P—P are at the opposite ends of resistor R. The AVC line is taken through a filter resistor-capacitor network from the midpoint of resistor 54.

The circuit of Fig. 5 differs from prior discriminator-rectifiers in that the audio tubes 15 and 16 are not separately energized from the diodes 52—53. Each audio tube receives one-half the difference between the outputs of the diodes. This result is obtained by the use of the auxiliary resistance R to which the amplifier cathodes are tapped. It will be seen that with the polarity of the diodes as indicated, a negative potential with respect to ground will be obtained at the common diode anode connection. Since this negative potential is proportional to the strength of the signals, it may be used as an AVC bias or to operate a tuning indicator. In Fig. 5 a discriminator is shown which employs two tuned circuits, one of which is tuned above the operating intermediate frequency by a certain frequency amount, while the other is tuned a corresponding frequency amount below the I. F. value. Such circuits are well known in discriminators. In Fig. 5 the diodes 52—53 are connected in the so-called parallel rectifying connection, but obviously the series connection may equally well be used as indicated in Fig. 6. In this modification each half of resistor 54 is shunted by a bypass condenser 54'.

Similarly, other discriminator arrangements may be used. One of such is shown in Fig. 7 where intermediate frequency voltage is delivered from a final I. F. amplifier tube by way of mutual inductance $M_1$ to a circuit 60 tuned to the mean frequency. This circuit 60 is coupled in turn by mutual inductance $M_2$ to a second similarly-tuned circuit 70. The midpoint of circuit 70 is connected to a point on circuit 60 so that the diodes receive respectively the vector sum and vector difference of the voltages of these circuits. The diode outputs are utilized as in Fig. 6. It may be noted that if bias battery 25 is employed for the amplifier tubes, this bias will establish the minimum value of the AVC voltage. Fig. 7, in turn, could have its diodes connected in the shunt rectifying manner of Fig. 5, if preferred.

It should be noted that in each of the figures, if the intermediate frequency voltage is at its mean frequency (the operating I. F. value) the diode outputs will be equal, and, hence, there will be no voltage impressed upon either of the amplifier tubes. As the intermediate frequency energy departs from its mean frequency value one of the amplifier grids 13 or 14 will be driven negative, while the other is driven positive. The AVC voltage, however, is determined by the sum of the outputs of the two rectifiers, and is, therefore, an extremum at the mean frequency, and is proportional to the signal strength at any given frequency. It should, also, be noted that the entire system is balanced with respect to ground.

While I have indicated and described several systems for carrying my invention into effect, it will be apparent to one skilled in the art that my invention is by no means limited to the particular organizations shown and described, but that many modifications may be made without departing from the scope of my invention.

What I claim is:

1. In a system for adjusting the position of a motor, a control device adapted to produce oscillations whose frequency is determined by the setting of an adjustable element, means remote from the control device for deriving from the oscillations a current whose magnitude is a function of the difference between said frequency and a predetermined frequency, a pair of grid-controlled gas rectifiers arranged in push-pull, means for feeding alternating current to said rectifiers, means to apply said derived current to the control grids of said rectifiers, means to apply the output of said rectifiers to said motor for energization thereof and means responsive to motor operation for controlling said current deriving means to prevent production of the derived current in response to said frequency difference becoming zero.

2. In a system for adjusting the position of a motor, a control device adapted to produce oscillations whose frequency is determined by the setting of an adjustable element, means remote from the control device for deriving from the oscillations a current whose magnitude is a function of the difference between said frequency and a predetermined frequency, a pair of grid-controlled gas rectifiers arranged in push-pull, means for feeding alternating current to said rectifiers, means to apply said derived current to the control grids of said rectifiers, means to apply the output of said rectifiers to said motor for energization thereof, and a pair of grid-controlled alternating current rectifiers in push-pull relation, and said last rectifiers coupling said deriving means to said control grids and motor-responsive means for preventing production of said derived current in response to zero frequency difference.

3. In a system of the type employed for adjusting the position of a motor, wherein a control device is used to produce oscillations whose frequency is determined by the setting of an adjustable element, and wherein means remote from the control device derives from the oscillations a voltage whose magnitude is a function of the difference between said frequency and a predetermined frequency; the improvement comprising a pair of grid-controlled gas rectifier tubes arranged in push-pull, means for feeding alternating current to said rectifiers, means to apply said voltage to the control grids of said rectifiers in push-pull relation, and means to apply the rectified output of said rectifiers to said motor for energization thereof.

4. In a system of the type for adjusting the position of a motor, wherein a control device is adapted to produce oscillations whose frequency is determined by the setting of an adjustable element, and wherein means remote from the control device derives from the oscillations a voltage whose magnitude is a function of the difference between said frequency and a predetermined frequency; the improvement comprising a pair of grid-controlled gas rectifier tubes arranged in push-pull, means for feeding alternating current to said rectifiers, means to apply said derived voltage to the control grids of said rectifiers, means to apply the rectified output of said rectifiers to said motor for energization thereof, a second pair of grid-controlled rectifier tubes arranged in push-pull relation, means to apply alternating current to said second pair for rectification, and said second pair of rectifier tubes coupling said deriving means to the control grids of the first pair of rectifier tubes.

WALTER van B. ROBERTS.

REFERENCES CITED

The following references are of record in the file of this patent:

UNITED STATES PATENTS

| Number | Name | Date |
|---|---|---|
| 2,334,704 | Hilferty | Nov. 23, 1943 |
| 2,280,019 | Alexanderson | Apr. 14, 1942 |
| 2,126,910 | Mosely | Aug. 16, 1938 |
| 2,303,654 | Newton | Dec. 1, 1942 |
| 2,015,967 | Ryder | Oct. 1, 1935 |
| 2,282,910 | Thomson | May 12, 1942 |
| 2,299,581 | Korman | Oct. 20, 1942 |

FOREIGN PATENTS

| Number | Country | Date |
|---|---|---|
| 638,442 | France | Feb. 21, 1928 |